(12) United States Patent
Arakawa

(10) Patent No.: US 8,045,205 B2
(45) Date of Patent: Oct. 25, 2011

(54) IMAGE FORMING DEVICE, AND METHOD AND COMPUTER READABLE MEDIUM THEREFOR

(75) Inventor: Eiji Arakawa, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 734 days.

(21) Appl. No.: 12/143,355

(22) Filed: Jun. 20, 2008

(65) Prior Publication Data
US 2008/0316514 A1 Dec. 25, 2008

(30) Foreign Application Priority Data
Jun. 22, 2007 (JP) .................. 2007-164447

(51) Int. Cl.
G06F 15/00 (2006.01)
G06F 17/00 (2006.01)

(52) U.S. Cl. ........................ 358/1.15; 715/255

(58) Field of Classification Search .......... 358/1.15, 358/1.13, 1.14, 1.16, 1.18, 1.1, 1.9, 1.17, 358/453, 450, 517, 1.12; 715/255, 239, 769, 715/716, 700, 201, 209, 330; 382/232, 166; 400/61, 63, 70, 174; 709/205, 201, 203, 709/223; 399/82, 87, 407
See application file for complete search history.

(56) References Cited

U.S. PATENT DOCUMENTS

| 6,707,568 B1 | 3/2004 | Yu |
| 2002/0026453 A1* | 2/2002 | Mori et al. ............. 707/104.1 |
| 2006/0197969 A1 | 9/2006 | Takagi |
| 2009/0097047 A1 | 4/2009 | Mitsui |

FOREIGN PATENT DOCUMENTS

| JP | 11-203089 | 7/1999 |
| JP | 2001-154821 | 6/2001 |
| JP | 2003-108331 A | 4/2003 |
| JP | 2006-085212 A | 3/2006 |
| JP | 2006-239946 A | 9/2006 |
| JP | 2007-249857 A | 9/2007 |

OTHER PUBLICATIONS

Notification of Reasons of Rejection dtd Apr. 28, 2009, JP application No. 2007-164447, English translation included.

* cited by examiner

Primary Examiner — Saeid Ebrahimi Dehkordy
(74) Attorney, Agent, or Firm — Banner & Witcoff, Ltd.

(57) ABSTRACT

A print control device includes a first data processing unit configured to process first print job data based on a first file format, a second data processing unit configured to process second print job data based on a second file format, the second data processing unit including a data converter configured to convert first print job data into second print job data, a display control unit configured to display an image that may be printed based on the second print job data processed by the second data processing unit, an input unit configured to select therethrough one of the first print job data processed by the first data processing unit and the second print job data processed by the second data processing unit, and an output unit configured to output the print job data selected through the input unit so as to be printed.

9 Claims, 5 Drawing Sheets

IMAGE FORMING DEVICE, AND METHOD AND COMPUTER READABLE MEDIUM THEREFOR

CROSS-REFERENCE TO RELATED APPLICATION

This application claims priority under 35 U.S.C. §119 from Japanese Patent Application No. 2007-164447 filed on Jun. 22, 2007. The entire subject matter of the application is incorporated herein by reference.

BACKGROUND

1. Technical Field

The following description relates to one or more print control techniques in which print data based on at least two kinds of file formats can be printed and print data based on a file format can be converted into print data based on a different file format.

2. Related Art

Conventionally, there has predominated as a print control device configured to control a printer, one configured to generate a vector-format intermediate file referred to as an EMF (Enhanced Meta File) (hereinafter, such an intermediate file will be referred to as an EMF file) on the basis of text data created through an application. The print control device which utilizes the EMF file performs a printing operation using a PDL (Page Description Language) data file, into which the EMF file is converted, conforming to various sorts of printers.

In addition, recently, there comes into use, a print control device that can handle an intermediate file described in a markup language such as an XML (Extensible Markup Language) (hereinafter, such an intermediate file will be referred to as an XML file), as well as can generate the EMF file.

Most of print control devices that utilize the XML file is provided with a function of converting the EMF file into the XML file. Currently, most of applications meet the print control devices which utilize the EMF file. Meanwhile, the print control device, which utilizes the XML file, is configured to conform to the application handling the EMF file with the function of converting the EMF file into the XML file.

Further, printer drivers to be installed into a print control device includes a printer driver configured to display a warning screen image under a predetermined condition and induce a user to judge whether to continue printing. For example, Japanese Patent Provisional Publication No. HEI 11-203089 (hereinafter referred to as '089 Publication) discloses a printer driver configured to set a threshold of a total number of printed papers or file size, display a warning message when a total number of printed papers or file size in a print job to be executed exceeds the threshold, and induce the user to judge whether to continue a printing operation. Thereby, unnecessary printing can be avoided.

SUMMARY

However, the aforementioned conventional print control device has following problems. One of the problems is that the conventional print control device which utilizes the XML file cannot accomplish perfect correspondence between the EMF file and the XML file into which the EMF file is converted due to those different design concepts. Therefore, the conventional print control device might fail to provide a desired printed result.

Further, in the conventional print control device, it can be understood only by checking an actually printed paper that a desired printed result has been obtained. In other words, it is impossible to understand whether any problem is caused in the file conversion prior to actual printing. Thus, a failure in the file conversion unfortunately generates a waste paper.

Meanwhile, it can be avoided to generate a waste paper by judging whether to continue the printing operation as disclosed '089 Publication. However, in the technique disclosed in '089 Publication, it is impossible to provide judgment based on the printed result. Thus, it cannot be avoided to generate a waste paper in the case where there is any problem in an actually printed result, for example, which is caused due to a failure in the file conversion into the XML file.

Aspects of the present invention are advantageous in that there are provided one or more improved print control devices, methods, and computer readable media that can provide a user-desired printed image and prevent a wastefully-generated paper.

According to aspects of the present invention, there is provided a print control device, which includes a first data processing unit configured to process first print job data based on a first file format, a second data processing unit configured to process second print job data based on a second file format, the second data processing unit including a data converter configured to convert first print job data into second print job data, a display control unit configured to display an image that may be printed based on the second print job data processed by the second data processing unit, an input unit configured to select therethrough one of the first print job data processed by the first data processing unit and the second print job data processed by the second data processing unit, and an output unit configured to output the print job data selected through the input unit so as to be printed.

In some aspects of the present invention, the print control device can perform printing operations based on the first file format and the second file format. The first print job data based on the first file format are processed by the first data processing unit, and the second print job data based on the second file format are processed by the second data processing unit. Further, since the second data processing unit includes the data converter configured to convert first print job data into second print job data, the second data processing unit can deal with both the first print job data and the second print job data.

Additionally, in the print control device, an image that may be printed based on the second print job data processed by the second data processing unit can be displayed by the display control unit. Thereby, an image to be printed based on the second print job data converted from the first print job data and/or processed by the second data processing unit can be checked, and it can be judged whether to print the image prior to a printing operation therefor. When the image is not a desired one and judged not to be printed, the first print job data processed by the first data processing unit are selected through the input unit, and the selected print job data are outputted so as to be printed. Thus, even though the data converter of the second data processing unit has a functional problem, the first print job data processed by the first data processing unit can be selected as print job data to be printed, and finally a user-desired image can be obtained. In addition, it is possible to check an image that may be printed immediately before the printing operation therefor, and then judge whether to print the image. Hence, wasteful printing can be avoided.

According to another aspect of the present invention, there is provided a method applicable to a print control device, which includes the steps of receiving first print job data based on a first file format, processing the first print job data received in the receiving step, converting the first print job data received in the receiving step into second print job data based on a second file format, processing the second print job data into which the first print job data are converted in the converting step, displaying an image that may be printed based on the second print job data processed in the step of processing the second print job data, selecting one of the first print job data processed in the step of processing the first print job data and the second print job data processed in the step of processing the second print job data, and outputting the print job data selected in the selecting step so as to be printed.

In the method configured as above, the same effects as the aforementioned print control device can be provided.

According to a further aspect of the present invention, there is provided a computer readable medium having computer readable instructions stored thereon, which cause a computer to perform the steps of receiving first print job data based on a first file format, processing the first print job data received in the receiving step, converting the first print job data received in the receiving step into second print job data based on a second file format, processing the second print job data into which the first print job data are converted in the converting step, displaying an image that may be printed based on the second print job data processed in the step of processing the second print job data, selecting one of the first print job data processed in the step of processing the first print job data and the second print job data processed in the step of processing the second print job data, and outputting the print job data selected in the selecting step so as to be printed.

In the computer readable medium configured as above, the same effects as the aforementioned print control device can also be provided.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the invention will be described with reference to the accompanying drawings. It is noted that the following embodiment is provided as an embodiment in which the present invention is applied to a personal computer (hereinafter, simply referred to as a "PC") with a printer driver installed thereinto.

[Configuration of Print System]

Figure 1:
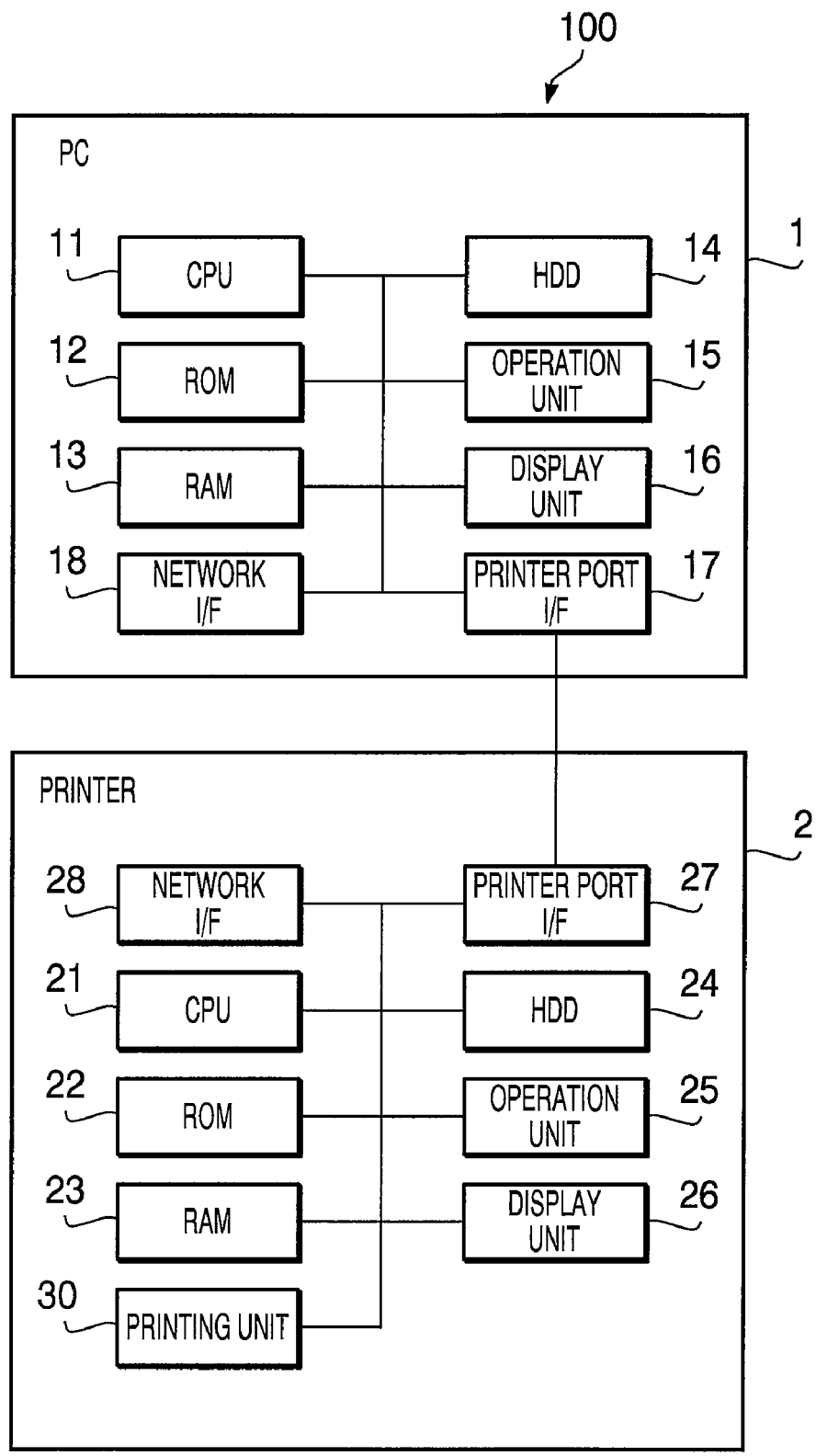
FIG. 1 is a block diagram schematically showing a configuration of a print system in an embodiment according to one or more aspects of the present invention.
Figure 2:
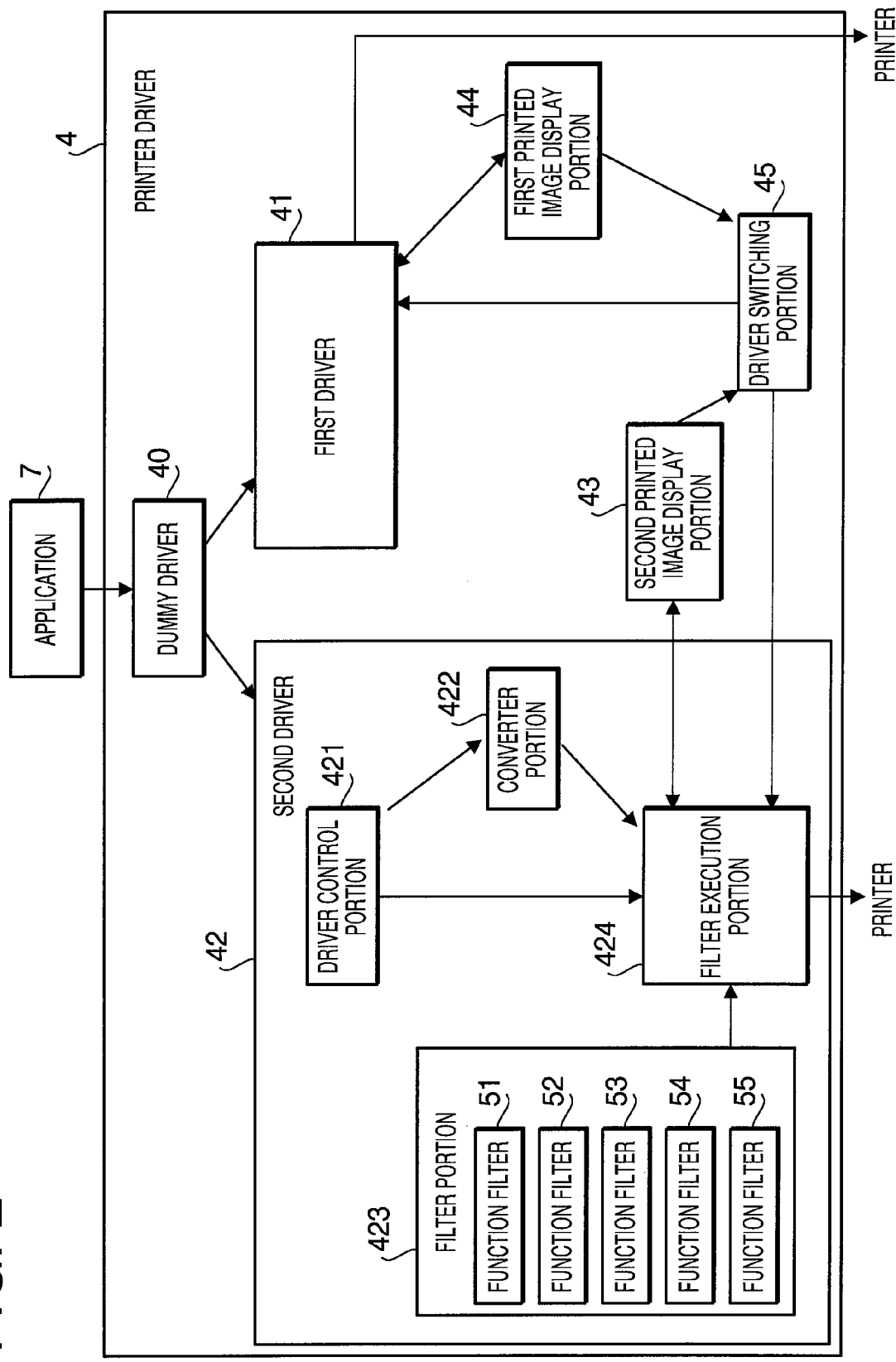
FIG. 2 is a block diagram schematically showing a functional configuration of a printer driver in the embodiment according to one or more aspects of the present invention.

A print system in the present embodiment is, as shown in FIG. 1, provided with a printer 2 as an image forming device, and a PC 1 as an information terminal device. In the print system 100, the PC 1 and printer 2 are connected via a USB cable. It is noted that the print system 100 is not limited to a system provided with one PC and one printer, and may include a plurality of PCs and a plurality of printers. Further, a cable connecting the PC 1 and printer 2 is not limited to the USB cable, and may be one of other cables such as a serial communication cable, parallel communication cable, wired LAN cable, and wireless communication route (e.g., wireless LAN).

The PC 1 includes a CPU 11 that executes various processes, ROM 12 that stores thereon a boot process program (BIOS) to be executed by the CPU 11 when launching the PC 1, RAM 13 utilized as a temporary memory area when the CPU 11 executes the various processes, and hard disk drive (HDD) 14 that stores therein various programs and data.

In addition, the PC 1 is provided with an operation unit 15 including a keyboard and/or mouse, display unit 16 including a LCD display, printer port interface 17 (in the present embodiment, a USB interface) through which signal communication with the printer 2 is performed, and network interface 18 through which signal communication on a network such as LAN and Internet is performed.

Further, there are stored in the HDD 14 of the PC 1, an operating system (OS), applications with which image data can be edited (e.g., document creating software, drawing software, spreadsheet software, and picture data editing software), and printer driver for transmitting PDL-format print data to the printer 2.

The printer 2 includes a CPU 21 that executes various processes, ROM 22 that stores thereon a boot process program to be executed by the CPU 21 when launching the printer 2, RAM 23 utilized as a temporary memory area when the CPU 21 executes the various processes, and hard disk drive (HDD) 24 that stores therein various programs and data.

In addition, the printer 2 is provided with an operation unit 25 including a plurality buttons disposed outside a housing of the printer 2, display unit 26 including an LCD panel disposed outside the housing of the printer 2, printer port interface 27 (in the present embodiment, a USB interface) through which signal communication with the PC 1 is performed, and a network interface 28 through which signal communication on a network such as LAN and Internet is performed.

Additionally, the printer 2 includes a printing unit 30 configured to form an image on a recording medium such as a paper and OHP transparent sheet (hereinafter, simply referred to as a "paper"). The printing unit 30 may form an image based on a general image forming method such as an electrophotographic method and inkjet method. In addition, the printing unit 30 may be capable of color printing and dedicated to monochrome printing.

In the print system 10 of the present embodiment provided with the printer 2 and PC 1 configured as above, a user can operate the PC 1 to edit image data including a document, figure, table, and picture with the applications installed into the PC 1. Further, in the print system 10, it is possible to transmit PDL-format print data to the printer 2 and output an image based on the print data with the printer 2 in accordance with a user's instruction.

Part of the applications installed into the PC 1 is provided with a printing function, with which print job data such as document data and image data are created for the printer driver. Based on the print job data, the printer driver creates print data required for printing the document data and image data with the printer 2.

The print data created by the printer driver are transmitted to the printer 2 via the printer port interface 17. The printer 2 controls the printing unit 30 to operate in response to receiving the print data. Then, based on the print data, the printer 2 forms a user-desired image on a paper selected by the user.

In addition, the application acquires setting information regarding papers previously set as papers on which the printer 2 can form an image from a printer driver for the printer 2. Then, the application registers the setting information acquired as paper setting items and size setting items. For example, there is registered with a "paper size" as one of the paper setting items, various sorts of paper sizes such as "A4," "A5," "B5," and "Post Card." Further, dimensions of the papers, and directions of a printed character are registered with the size setting items. The application provides a page setting screen and/or preview screen on which the setting information registered through user's selections is reflected.

In addition, the application acquires function information that can be provided as functions of the printer driver from the printer driver. The functions of the printer driver, for example, include watermarking, sorting, and multi-page printing. Further, the functions have respective different setting items. For example, in the watermarking function, there are configured a setting of "Use" or "Do Not Use" a watermark, and setting of watermark color "Black," "Gray," or "Red."

[Configuration of Printer Driver]

Subsequently, detailed description of a printer driver 4 installed into the PC 1 will be given. The printer driver 4 for the printer 2 includes a dummy driver 40, first driver 41, second driver 42, first printed image display portion 44, second printed image display portion 43, and driver switching portion 45.

The dummy driver 40 is configured to receive print job data of the EMF file format or XML file format that are outputted from the an application 7 and transmit the print job data to the first driver 41 and second driver 42. Namely, the dummy driver 40 does not perform substantial data processing for the print job data or development thereof into a binary file, and only does transmit the print job data. It is noted that the print job data outputted from the application 7 are actually stored in a spooler, and sequentially sent to the printer driver 4, yet, in the present embodiment, description regarding the spooler will be omitted for the sake of simple explanation.

The first driver 41 is configured to create bit-mapped data based on an EMF file outputted from the application 7 via the dummy driver 40 and finally transmit print data of PDL format to the printer 2. The first driver 41 develops the print data on a memory and performs data processing such as "2 in 1" and "watermark" on the memory. Namely, the first driver 41 outputs the PDL-format print data as already processed.

The second driver 42 is configured to process the XML file outputted from the application 7 via the dummy driver 40, create bit-mapped data based on the processed XML file, and finally output PDL-format print data to the printer 2. Namely, the second driver is a driver that can deal with data based on a different file format from that of the first driver 41. Specifically, the second driver 42 is provided with a driver control portion 421, converter portion 422, filter portion 423 including function filters 51 to 55, and filter execution portion 424.

The driver control portion 421 is configured to receive the print job data from the dummy driver 40 and manage information regarding the function filters 51 to 55. When the received print job data are the XML file, the driver control portion 421 sends the XML file to the filter execution portion 424. Meanwhile, when the received print job data are the EMF file, the driver control portion 421 sends the EML file to the filter execution portion 424 via the converter portion 422.

The converter portion 422 is configured to convert the EMF file into the XML file. Namely, the second driver 42 can deal with both print file formats of the EMF file and XML file.

The filter portion 423 represents a library group of the function filters 51 to 55 owned by the printer driver 4. The second driver 42 is provided with modules for implementing various kinds of data processing as "function filters" which can be added to and deleted from the printer driver. The function filters 51 to 55 are provided as DLL, and individually read out into the memory when utilizing them.

Specifically, in the present embodiment, there are provided a "watermark filter" for adding a watermark character as the function filter 51, "scaling filter" for displaying an image at a predetermined magnification as the function filter 52, "layout filter" for performing 2-in-1 printing or poster printing as the function filter 53, "mirror filter" for reversing an image horizontally or vertically as the function filter 54, and "RIP filter" for developing data described in a page-description language (XML file) into bit-mapped data and converting the bit-mapped data into PDL-format print data as the function filter 55.

The filter execution portion 424 has a function of executing data processing for print job data. When executing the data processing for print job data, the function filters 51 to 55 are read out. Then, the completely processed print job data are developed, via the RIP filter, from the XML file to the bit-mapped data. Thereafter, the bit-mapped data are converted into the PDL-format print data, which are then sent to the printer 2.

The second printed image display portion 43 has a function of displaying a printed image (preview) based on the print job data in a state where the data processing therefor is completed in the filter execution portion 424 of the second driver 42 (i.e., in a state prior to having the print job data pass through the RIP filter). The print job data in such a state, which are described based on the XML format, can easily be displayed as a printed image by the second printed image display portion. Thus, the user can check, in advance, a printed image to be outputted from the printer 2 via the second driver 42.

Figure 3:
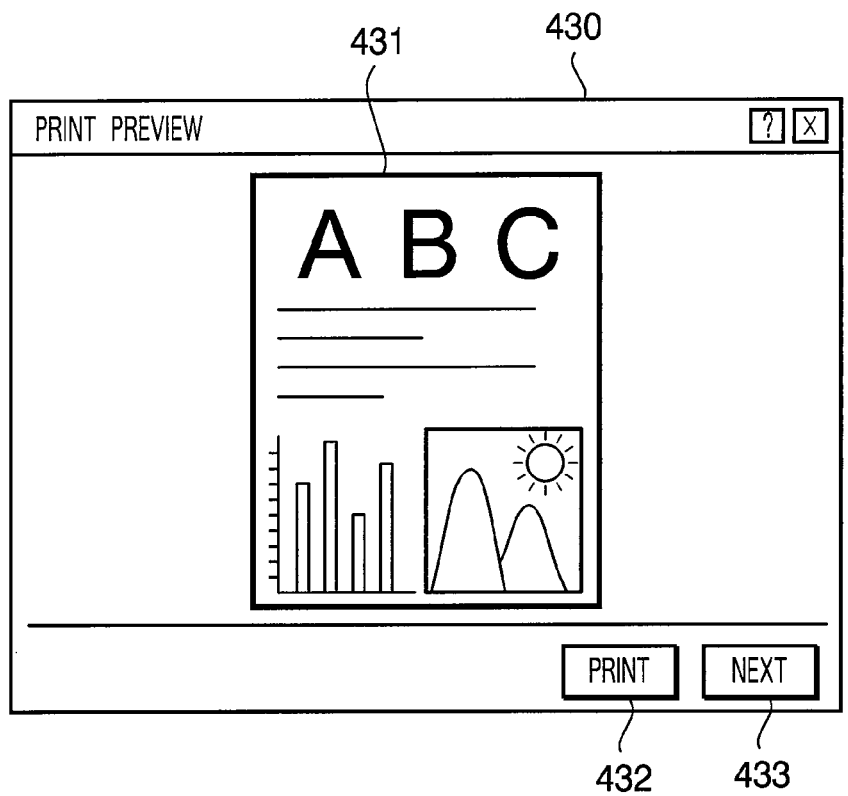
FIG. 3 is an example of a screen image provided by a second printed image display portion of the printer driver in the embodiment according to one or more aspects of the present invention.

FIG. 3 schematically shows an example of a screen image of a user interface 430 provided by the second printed image display portion 43. In the present embodiment, a preview 431 of the print job data is displayed at a center of the user interface 430. In addition, there are displayed under the preview 431, a "Print" button 432 and "Next" button 433. When the "Print" button 432 is pressed, an image displayed on the preview 431 is printed. Namely, the print data processed by the second driver 42 are transmitted to the printer 2. When the "Next" button 433 is pressed, there is displayed a below-mentioned user interface 440 provided by the first printed image display portion 44. It is noted that a screen layout and display functions of the user interface 430 shown in FIG. 3 are just examples, and they are not limited to such examples.

The first printed image display portion 44 has a function of displaying a printed image (preview) based on the print job data as the EMF file or the print job data in a state where data processing therefor is completed in the first driver 41 and the print job data have not yet converted into the PDL-format data (i.e., in a state converted into the bit-mapped data). The user can check, in advance, a printed image to be outputted from the printer 2 via the first driver 41.

Figure 4:
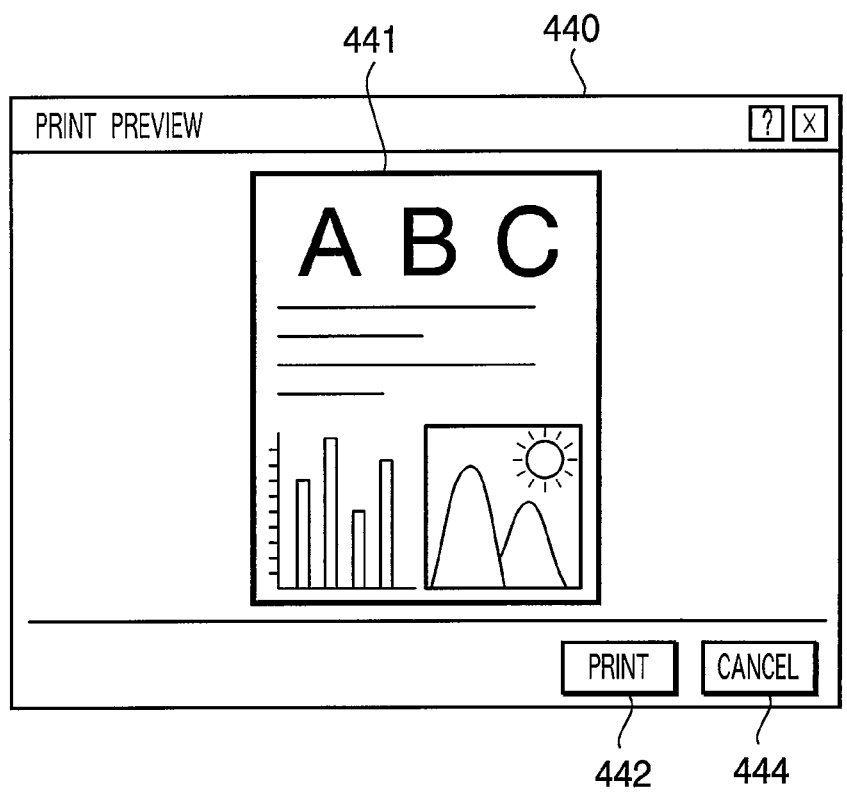
FIG. 4 is an example of a screen image provided by a first printed image display portion of the printer driver in the embodiment according to one or more aspects of the present invention.

FIG. 4 schematically shows an example of a screen image of a user interface 440 provided by the first printed image display portion 44. In the present embodiment, as well as the user interface 430 of the second printed image display portion 43, a preview 441 based on the print job data is displayed at a center of the user interface 440. In addition, there are displayed under the preview 441, a "Print" button 442 and "Cancel" button 444. When the "Print" button 442 is pressed, an image displayed on the preview 441 is printed. Namely, the print data processed by the first driver 41 are transmitted to the printer 2. When the "Cancel" button 444 is pressed, the print job is canceled. Namely, a cancel command is issued to each of the first driver 41 and second driver 42. It is noted that a screen layout and display functions of the user interface 440 shown in FIG. 4 are just examples, and they are not limited to such examples.

The driver switching portion 45 has a function of switching a driver to take main control of the printer driver 4 between the first driver 41 and the second driver 42. In other words, the driver switching portion 45 has functions of selecting either the data outputted via the first driver 41 or the data outputted via the second driver 42 as the print data to be finally transmitted to the printer 2 and deleting non-selected data.

[Operation of Printer Driver]
[Driver Printing Process]

Hereinafter, a printing process to be executed when the printer driver 4 receives the print job data will be described. The printer driver 4 is configured to generally output the print data via the second driver 42, and to output the print data via the first driver 41 in the case where the data processing or data conversion is not appropriately performed in the second driver 42.

Specifically, in the present driver printing process, when receiving the XML file, the print data are sent out to the printer 2 via the second driver 42. Meanwhile, when receiving the print job data as the EMF file, there are transmitted to the printer 2 either the print data via the first driver 41 or the print data via the second driver 42.

Figure 5:
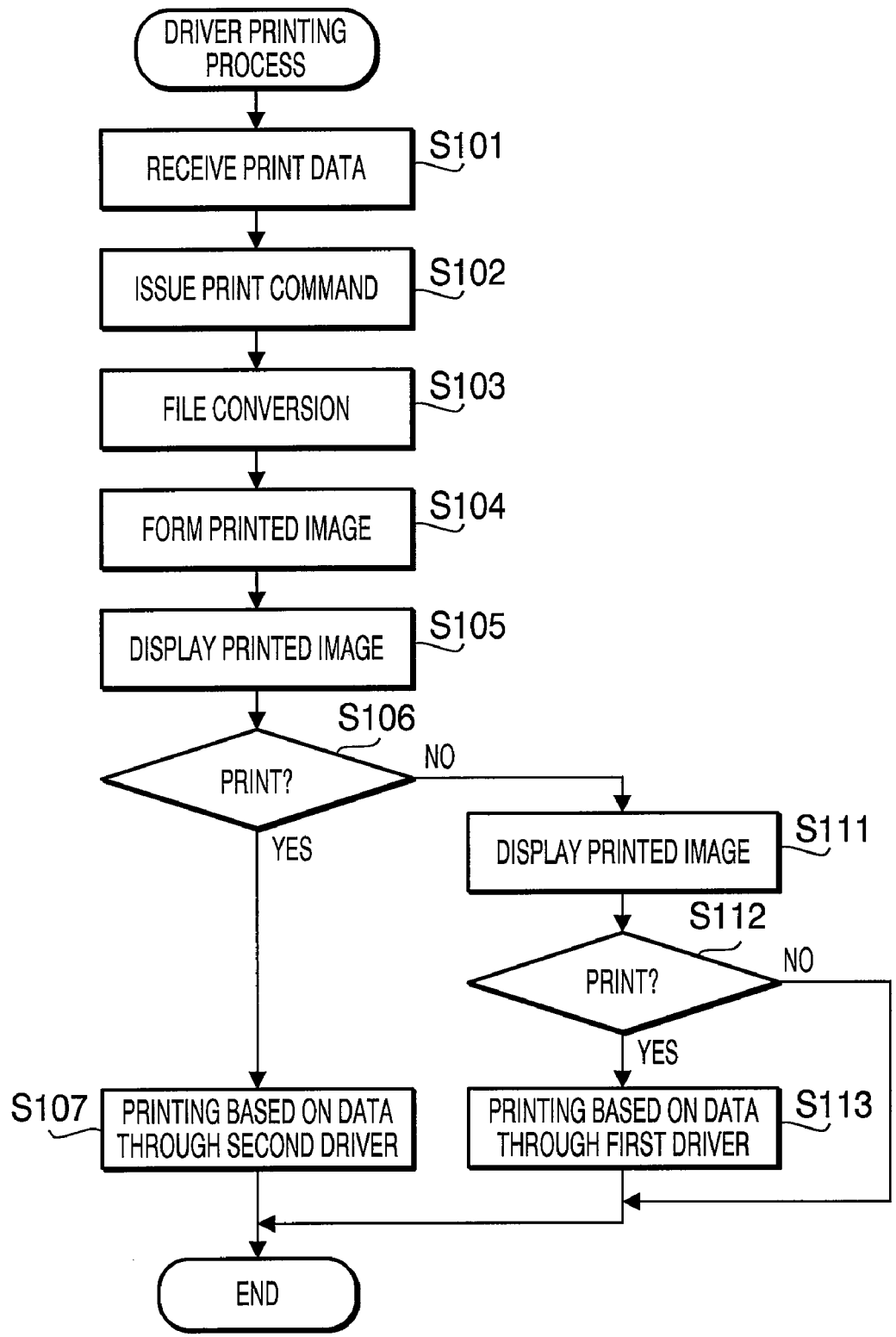
FIG. 5 is a flowchart showing a printing process to be executed by the printer driver in the embodiment according to one or more aspects of the present invention.

Hereinafter, a printing process to be executed by the printer driver 4 when the dummy driver 40 receives the EMF file will be described with reference to a flowchart shown in FIG. 5.

Firstly, the dummy driver 40 acquires print job data as the EMF file from the application 7 (S101). Then, the dummy driver 40 issues a print command to each of the first driver 41 and the second driver 42 (S102). Namely, the print job data are transmitted to both the first driver 41 and second driver 42.

The second driver 42 converts the EMF file received into the XML file with the converter portion 422 (S103). The converted XML file is transmitted to the filter execution portion 424.

Subsequently, the filter execution portion 424 reads out the function filters 51 to 55 from the filter portion 423, and implements data processing for the XML file. Thereby, XML-file-based print job data (in a state prior to having the print job data pass through the RIP filer) are created (S104).

It is noted that the first driver 41 also receives the print job data as the EMF file, executes data processing for the print job data, and converts the processed data into PDL-format data (in a state prior to having the print job data pass through the RIP filter). The first driver 41 keeps waiting ready without sending the converted data to the printer 2.

Next, the user interface 430 (see FIG. 3) of the second printed image display portion 43 is booted, and a printed image based on the print job data created by the second driver 42 (in a state prior to having the print job data pass through the RIP filter) is displayed (S105). Thereby, the user can check the image to be printed by the printer 2 before sending the print job data to the printer 2. In S106, the printer driver 4 keeps waiting ready until the user select whether to print the image.

When the "Print" button 432 is pressed (S106: Yes), the print job data processed by the second driver are transmitted to the printer 2 via the RIP filter (S107). At this time, the cancel command for canceling the print job is issued to the first driver 41, and the print job data of the first driver 41 are deleted. After sending the print data, the present process is terminated.

Meanwhile, when the user does not judge to print the image, namely, when the "Next" button 433 is pressed, the user interface 430 is closed, and the user interface 440 (see FIG. 4) of the first printed image display portion 44 is booted, on which the printed image based on the print job data created by the first driver 41 is then displayed (S111). Namely, when the "Next" button 433 is pressed, the driver to take print control is switched by the driver switching portion 45 from the second driver 42 to the first driver 41. The user can check the printed image to be outputted from the first driver instead of the second driver. In S112, the printer driver 4 keeps waiting ready until the user judges whether to print the image.

When the user judges to print the image, namely, when the "Print" button 442 is pressed (S112: Yes), the print data processed by the first driver 41 are sent to the printer 2 via the RIP filter (S113). At this time, the cancel command for canceling the print job is issued to the second driver 42, and the print job data of the second driver 42 are deleted. After sending the print data, the present process is terminated.

Meanwhile, when the user does not judge to print the image, namely, when the "Cancel" button 444 is pressed (S112: No), the user interface 440 is closed. At this time, the cancel command for canceling the print job is issued to each of the first driver 41 and second driver 42, and the present process is terminated.

Subsequently, a printing process to be executed by the printer driver 4 when the dummy driver 40 receives the XML file.

Firstly, the dummy driver 40 acquires print job data from the application. Then, the dummy driver 40 issues a print command to each of the first driver 41 and second driver 42. This step is not different from the case of the EMF file. Namely, there is no difference with respect to the interface of the printer driver 4 between the cases of the EMF file and XML file.

Next, the second driver 42 sends the XML file received to the filter execution portion 424 without sending it to the converter portion 422. The filter execution portion 424 reads out the function filters 51 to 55 from the filter portion 423, and executes data processing for the XML file. Thereby, the XML-file-based print job data to be transmitted to the printer 2 are created.

Subsequently, the print data processed by the second driver 42 are transmitted to the printer 2. Namely, in the present printing process, the conversion process by the converter portion 422 is not executed, and thus no trouble due to the data conversion is caused. Therefore, even though the checking of the printed image is not made, a user-desired printed image is more likely to be obtained, and a waste paper is less likely to be generated. Hence, the displaying and checking of the printed image are not performed. Thereafter, the cancel command for canceling the print job is issued to the first driver 41, and the print job data of the first driver 41 are deleted.

Meanwhile, the first driver 41 is not provided with a converter portion for converting the XML file into the EMF file. Therefore, after the first driver 41 waits for and receives the cancel command without having to send the print data, the present process is terminated.

It is noted that the second driver 42 may be configured such that the user interface 430 (see FIG. 3) is displayed by the second printed image display portion 43 prior to sending the print job data to the printer 2 so as to check the printed image based on the print job data created by the second driver 42, as well as the case where the EML file is received. In this case, since no print job data are created at the first driver 41 side, the "Next" button 433 for switching the driver to take the print control to the first driver 41 is not displayed, and it is judged whether to print the image or not.

In addition, when the first driver 41 is provided with a converter portion for converting the XML file into the EMF file, a "Next" button for switching the driver to take the print control to the first driver 41 may be displayed, and it may be judged whether to print the image with the first driver 41 or not.

[Application Examples]

Figure 6:
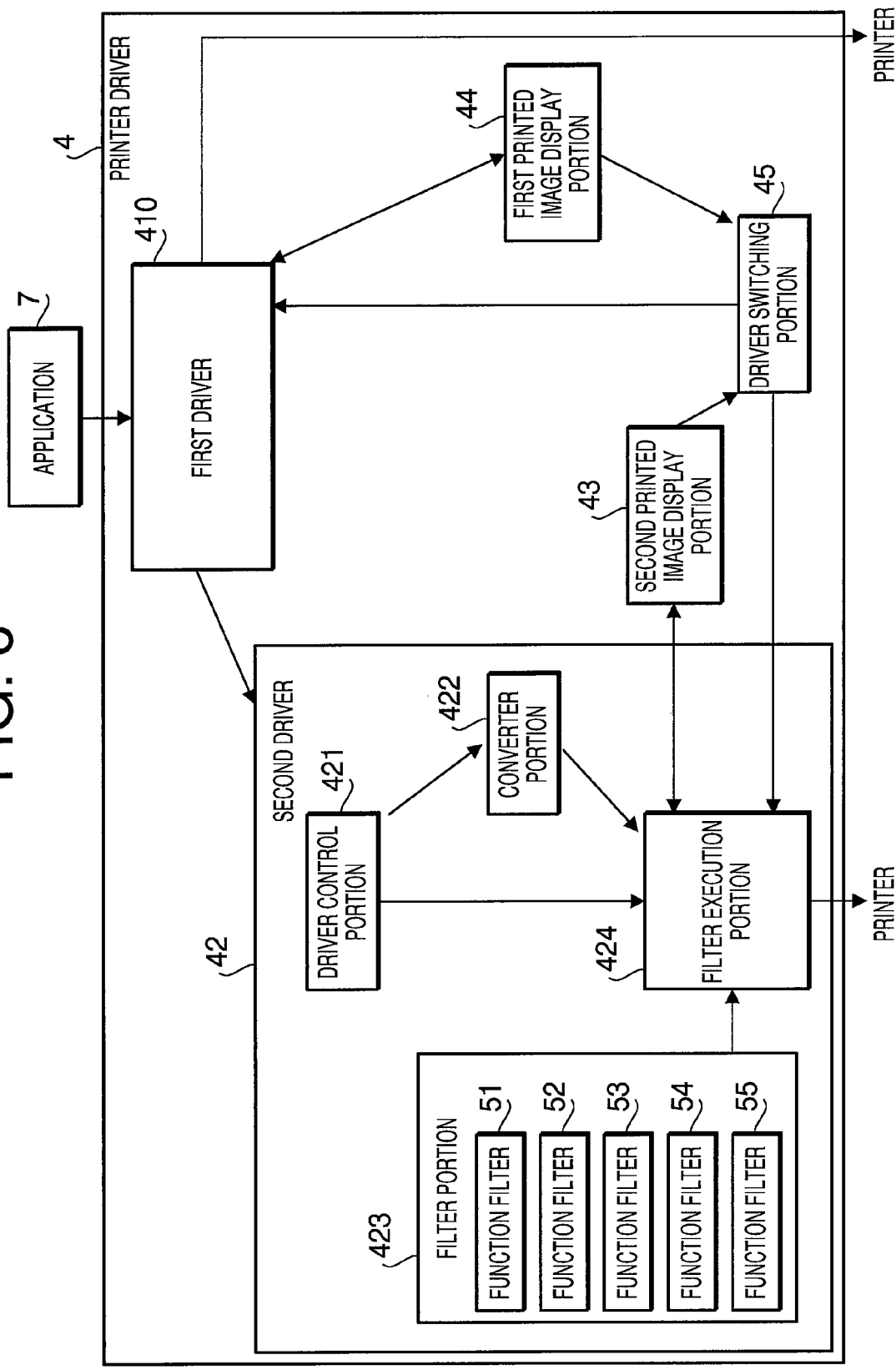
FIG. 6 is a block diagram schematically showing a functional configuration of a printer driver in an application example according to one or more aspects of the present invention.

In the present embodiment, the dummy driver 40 is provided to transmit the print job data to the first driver 41 and the second driver 42. However, the present invention is not limited to such a configuration. For example, as shown in FIG. 6, the first driver 410 may be configured to receive the print job data, and the print command may be issued from the first driver 410 to the second driver 42. Namely, the first driver 410 may double as the dummy driver 40.

Further, in the present embodiment, when the user is not satisfied with the printed image displayed by the second printed image display portion 43, the first printed image display portion 44 displays the printed image to be outputted from the printer 2. However, the present invention is not limited to such a configuration. For example, when the user is not satisfied with the printed image displayed by the second printed image display portion 43, the printing may be performed via the first driver 41 without displaying the printed image by the first driver 41.

Further, in the present embodiment, when the user is not satisfied with the printed image displayed by the first printed image display portion 44, the "Cancel" button 444 is pressed. However, the present invention is not limited to such a configuration. For example, a "Back" button may be provided, and when the button is pressed, the user interface 430 by the second printed image display portion 43 may be re-displayed.

Further, in the present embodiment, when the user interface 440 by the first printed image display portion 44 is displayed, the user interface 430 by the second printed image display portion 43 is closed. However, the user interface 440 may be displayed with the user interface 430 kept displayed. In the case where both the user interfaces 430 and 440 are kept displayed, it is easier to compare the both interfaces 430 and 440. Further, in this case, the cancel command may not be issued to a non-selected driver side. Namely, both the printed images through the first driver 41 and second driver 42 may be printed.

As described in detail above, the printer driver 4 of the present embodiment is capable of printing based on the two kinds of file formats, the XML file and EMF file. The first driver 41 performs data processing for print job data as the EMF file, while the second driver 42 performs data processing for print job data as the XML file. Further, the second driver 42 includes the converter portion 422 for converting the print job data based on the EMF file format into the print job data based on the XML file format so as to meet both the file formats.

Further, in the printer driver 4, the second printed image display portion 43 displays a printed image based on print job data processed through the second driver 42. Namely, the user can check the printed image based on the print job data processed or converted through the second printed image print display portion 43 and judge whether to print the image before an actual printing operation is performed by the printer 2. When the printed image is not a user-desired one, the driver to take the print control is switched by the driver switching portion 45 from the second driver 42 to the first driver 41. Thereby, when there is caused any trouble in the data conversion by the second driver 42, the user can select the first driver 41 and finally obtain a desired image. In addition, since the user can check the printed image just before the actual printing operation thereof and judge whether to print the image, unnecessary printing can be avoided. Further, since the printed image in a state just before the actual printing operation thereof is displayed, the user can discriminate whether or not a failure recognized has been caused due to any problem in a program of the print control device. Thus, a user-desired print result can be obtained, and there are attained a print control device and a printer driver program that make it possible to prevent a wastefully-consumed paper.

In addition, the printer driver 4 is provided with the first printed image display portion 44 that displays a printed image based on print job data processed by the first driver 41. Thereby, the user can compare a result obtained through the second driver 42 with a result obtained through the first driver 41, and obtain a more appropriate image.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

For example, the image forming according to aspects of the present invention is not limited to a printer, yet may be a copy machine, facsimile machine, or multi function peripheral with an image forming function. In addition, the information terminal device according to aspects of the present invention is not limited to a PC, yet may be a workstation or mobile information terminal device. Furthermore, the print system according to aspects of the present invention is not limited to a system in which the image forming device and information terminal device are separately provided, yet may be a system integrated with the image forming device and information terminal device.

What is claimed is:

1. A print control device, comprising:
a first data processing unit configured to process first print job data based on a first file format;
a second data processing unit configured to process second print job data based on a second file format, the second data processing unit including a data converter configured to convert first print job data into the second print job data;
a display control unit configured to display an image that is printable based on the second print job data processed by the second data processing unit;
an input unit configured to select therethrough one of the first print job data processed by the first data processing unit and the second print job data processed by the second data processing unit; and
an output unit configured to output the print job data selected through the input unit so as to be printed.

2. The print control device according to claim 1, further comprising a data receiving unit configured to receive print job data including one of the first print job data and the second print job data and issue a print command to each of the first data processing unit and the second data processing unit.

3. The print control device according to claim 1,
wherein the first data processing unit receives print job data including one of the first print job data and the second print job data and issues a print command for the received print job data to the second data processing unit.

4. The print control device according to claim 1, further comprising a second display control unit configured to display an image that is printable based on the first print job data processed by the first data processing unit.

5. The print control device according to claim 4, further comprising a second input unit through which it is judged based on the image displayed by the second display control unit whether to print the first print job data processed, when the first print job data processed by the first data processing unit is selected through the input unit,
wherein the output unit outputs the first print job data processed so as to be printed, when it is judged through the second input unit that the first print job data processed is to be printed.

6. The print control device according to claim 1,
wherein the output unit deletes the other print job data that have not been selected through the input unit.

7. A method applicable to a print control device, comprising the steps of:
receiving first print job data based on a first file format;
processing the first print job data received in the receiving step;
converting the first print job data received in the receiving step into the second print job data based on a second file format;
processing the second print job data into which the first print job data are converted in the converting step;
displaying an image that is printable based on the second print job data processed in the step of processing the second print job data;
selecting one of the first print job data processed in the step of processing the first print job data and the second print job data processed in the step of processing the second print job data; and
outputting the print job data selected in the selecting step so as to be printed.

8. A non-transitory computer readable medium having computer readable instructions stored thereon, which cause a computer to perform steps of:
receiving first print job data based on a first file format;
processing the first print job data received in the receiving step;
converting the first print job data received in the receiving step into the second print job data based on a second file format;
processing the second print job data into which the first print job data are converted in the converting step;
displaying an image that is printable based on the second print job data processed in the step of processing the second print job data;
selecting one of the first print job data processed in the step of processing the first print job data and the second print job data processed in the step of processing the second print job data; and
outputting the print job data selected in the selecting step so as to be printed.

9. A print control device comprising:
a processor; and
memory storing computer readable instructions that, when executed, cause the print control device to:
process first print job data based on a first file format;
process second print job data based on a second file format, wherein the first print job data is converted into the second print job data;
display an image that is printable based on the second print job data;
select one of the processed first print job data and the processed second print job data; and
output the selected print job data through an output unit so as to be printed.

* * * * *